Patented Dec. 22, 1931

1,837,353

UNITED STATES PATENT OFFICE

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN

METHOD OF INCREASING ANHYDROUS MAGNESIUM CHLORIDE CONTENT IN AIR DRIED MAGNESIUM CHLORIDE

No Drawing. Application filed May 14, 1928. Serial No. 277,801.

This invention relates to methods of obtaining magnesium chloride in substantially anhydrous condition and has particular reference to a method of finishing the dehydration which has been in part accomplished by air-drying hydrated magnesium chloride.

A plentiful source of magnesium chloride is found in natural brines from which magnesium chloride containing water of crystallization, usually $MgCl_2 6H_2O$, is readily separated.

In order to dehydrate such a chloride for the production of anhydrous chloride or a product in which the chloride is largely in the anhydrous form, various methods may be followed, an economical method being the drying of the normal hydrated salt, $$MgCl_2 6H_2O$$

or the form with four molecules of water, i. e., $MgCl_2 4H_2O$, in a current of hot air such as the products of combustion of fuel under conditions of temperature regulation and control, whereby the water of crystallization is driven off and removed in the said air current. In such methods of drying decomposition occurs and the resulting product, even when finished at a drying temperature of 800° C., and although substantially free from crystal water, still contains combined hydrogen and oxygen. By varying the rate of drying, temperature of drying, pressure under which drying is conducted and other conditions affecting the partial pressures and temperatures existing in the dryer, the extent of decomposition may be somewhat controlled, but in all cases there will be found in the product so obtained a quantity of combined hydrogen and oxygen in which the ratio of these elements remains constant indicating that the so-dried product is comprised largely of anhydrous $MgCl_2$ and a basic salt equivalent to MgOHCl.

As a matter of fact when hydrated magnesium chloride is dried, either in air, wet or dry, or in any inert atmosphere, whether at normal pressure or in vacuum, until all water as such together with hydrochloric acid is driven off, there results a product containing magnesium, chlorine, oxygen and hydrogen. A peculiarity of this product is that if the hydrogen content be figured as water ($H_2O$) and the remaining oxygen be figured as magnesium oxide (MgO), the molecular ratio of the latter to the former is constant at unity no matter what the total content of such hydrogen and oxygen may be, it being understood that such total content will vary depending upon the method and rate of drying. This, it is believed, indicates that the product in question is composed of magnesium chloride ($MgCl_2$) anhydrous and the oxy-chloride (MgOHCl). For want of a better term this product is herein referred to as air dried magnesium chloride or else as magnesium chloride containing basic magnesium chloride; however, it is not intended thereby to define the product as one having any precise constitutional formula.

The main object of my present improved process is to increase the content of the anhydrous chloride in a magnesium chloride product such as that just described, and to the accomplishment of this and related ends, the invention then consists of the steps hereinafter fully described and particularly pointed out in the claims, the following description setting forth but several of the ways in which the principle of the invention may be utilized.

By way of general description of the process in hand I subject the hereinbefore described air dried or equivalent magnesium chloride product to an atmosphere of HCl, preferably substantially dry HCl, which is absorbed by the basic salt with the production of $MgCl_2.H_2O$ in accordance with the following reaction:—

$$MgOHCl + HCl \rightarrow MgCl_2.H_2O$$

This reaction involves the simple absorption of HCl and it is only necessary that the material be exposed to an atmosphere of HCl under the required pressure and temperature, since the reaction is reversible. Practically it is sufficient to treat the air dried chloride in a closed vessel by introducing thereinto a supply of substantially dry HCl, the temperature for absorption at 750 mm. being maintained below 280° C., which is the dissociation temperature of $MgCl_2.H_2O$ for that pressure. Operating at lower pressures the temperature will be maintained at correspondingly lower values.

When no more HCl is absorbed, indicating the completion of the reaction upon the basic chloride content, the temperature is then raised above the dissociation temperature for the pressure used, whereupon a decomposition of the $MgCl_2.H_2O$ content of the hot salt formed during absorption occurs with the formation of anhydrous $MgCl_2$, MgOHCl, water and hydrochloric acid gas. The heating is continued until no more gaseous products are evolved, when it will be found that the content of anhydrous chloride has been increased and a product obtained similar to the original air dried product, but containing a correspondingly reduced content of the basic salt. If the content of anhydrous salt has been sufficiently raised by the one operation as described above the product may be withdrawn and used as such, but if it be desired to still further increase the anhydrous chloride content the step of treatment with HCl, followed by further heating to secure a further dehydration, may be repeated one or more times as may be necessary to obtain a final product sufficiently high in anhydrous chloride to meet the requirements in hand.

A convenient method of carrying out my process is as follows. Into a suitable closed container, which may be a steel chamber, is charged a quantity of the air dried product containing the basic salt. The temperature must be below 280° C., if working at one atmosphere pressure, and preferably below 200° C., to permit use of HCl at lower partial pressures. HCl gas, preferably dried, will then be admitted and will be absorbed by the basic salt. When no more HCl is absorbed, the supply of HCl is cut off and the charge is then heated to a temperature above 280° C., either in situ, or it may be withdrawn and passed through a kiln or other convenient type of dryer in which it may be heated, preferably in a current of hot air or of hot products of combustion. The $MgCl_2.H_2O$ formed in the absorption step is here decomposed chiefly into anhydrous chloride together with some of the basic salt.

It is known that the air dried product herein treated by my process may be converted entirely to anhydrous $MgCl_2$ by drying in a current of HCl gas at a temperature at which the water vapor formed by the absorption of the HCl is driven off as water vapor and is carried away in the current of gas. This method of proceeding is, however, attended with considerable expense and inconvenience, chiefly arising from the necessity to provide a large quantity of dry HCl gas, and to make it economical, such gas must have the water of dehydration removed from it so that the gas may be reused by recycling through the dryer. The dehydration of such a gas is difficult and expensive and the heat losses in recycling are heavy. The drying reaction may only be carried to the final end point by long time contact at high temperature with the dry gas current, because, although the surface of the particles is readily reacted upon, the cores of the particles are necessarily surrounded by an envelope of water vapor inhibiting the formation of the strictly anhydrous salt and time is required for diffusion to act in dissipating the water vapor envelope and substituting the HCl environment.

I have found that proceeding in accordance with my improved method there may be obtained a final product containing but a very small portion, e. g., ½%, equivalent MgOHCl.

I prefer to use as starting material an air dried product in the form of chips or flakes or other granulated form which may be readily obtained by air drying the flaked $MgCl_2 6H_2O$ or the flaked $MgCl_2 4H_2O$.

The product obtained by my method is for most purposes the substantial equivalent of the more expensive product which may be obtained by dehydration in a current of HCl gas and I find same suitable, for instance, as a feed to an electrolytic cell employing a fused bath containing $MgCl_2$ for the production of metallic magnesium.

Other modes of applying the principle of my invention may be employed instead of the one explained, change being made as regards the steps herein disclosed, provided those stated in any of the following claims or their equivalents be employed.

I therefore particularly point out and distinctly claim as my invention:—

1. The method of increasing the anhydrous magnesium chloride content of air dried magnesium chloride which comprises the steps of absorbing HCl in said air dried chloride while maintaining the pressure thereon at substantially one atmosphere and temperature thereof below 280° C. and then raising the temperature of the so treated chloride above 280° C. to expel water therefrom as vapor.

2. The method of increasing the anhydrous magnesium chloride content of air dried magnesium chloride containing a basic component which comprises the steps of absorbing HCl in said air dried chloride under atmospheric pressure while maintaining the temperature thereof below 280° C. and then heating the so treated material at a temperature above 280° C. in a hot gaseous current of the products of combustion of fuel to expel water vapor.

3. The method of increasing the anhydrous magnesium chloride content of air dried magnesium chloride containing a basic component which comprises the steps of absorbing HCl in said air dried chloride under atmospheric pressure while maintaining the temperature thereof below 280° C. and then heating the so treated material to a temperature of about 280° to 290° C. in a hot gaseous current of the products of combustion of fuel to expel water vapor.

4. The method of preparing anhydrous magnesium chloride which comprises alternately subjecting air-dried particles of magnesium chloride containing a component of basic chloride to the action of hydrochloric acid gas at a temperature below 280° C. and then heating the product so obtained at a temperature above 280° C. until such basic chloride component is converted substantially to the anhydrous chloride.

5. The method of preparing anhydrous magnesium chloride which comprises alternately subjecting air-dried particles of magnesium chloride containing a component of basic chloride to the action of hydrochloric acid gas at a temperature below 280° C. and then heating the product so obtained at a temperature above 280° C. but not greatly exceeding 290° C. until such basic chloride component is converted substantially to the anhydrous chloride.

6. The method of preparing anhydrous magnesium chloride which comprises alternately subjecting air-dried particles of magnesium chloride containing a component of basic chloride in a closed space to the action of hydrochloric acid gas at a temperature below 280° C. and then heating the product so obtained in a hot gaseous current of products of combustion of fuel at a temperature above 280° C. until such basic chloride component is converted substantially to the anhydrous chloride.

7. The method of increasing the anhydrous magnesium chloride content of air-dried magnesium chloride containing a component of basic chloride which comprises reacting the same with hydrochloric acid gas to convert such basic chloride to $MgCl_2.H_2O$ and then heating the product to expel water from such mono-hydrate, thereby forming a further component of anhydrous chloride in the final product.

8. The method of increasing the anhydrous magnesium chloride content of air-dried magnesium chloride containing a component of basic chloride which comprises reacting the same with hydrochloric acid gas to convert such basic chloride to $MgCl_2.H_2O$ and then heating the product in a hot aeriform current to expel water from such mono-hydrate, thereby forming a further component of anhydrous chloride in the final product.

9. The method of increasing the anhydrous magnesium chloride content of air-dried magnesium chloride containing a component of basic chloride which comprises reacting the same with hydrochloric acid gas to convert such basic chloride to $MgCl_2.H_2O$ and then heating the product by contact with hot gases from the combustion of fuel to expel water from such mono-hydrate, thereby forming a further component of anhydrous chloride in the final product.

Signed by me, this 10th day of May, 1928.

EDWIN O. BARSTOW.